United States Patent
Bshara et al.

(10) Patent No.: US 10,901,627 B1
(45) Date of Patent: Jan. 26, 2021

(54) TRACKING PERSISTENT MEMORY USAGE

(71) Applicant: Amazon Technologies, Inc., Seattle, WA (US)

(72) Inventors: Nafea Bshara, San Jose, CA (US); Thomas A. Volpe, Austin, TX (US); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 15/445,324

(22) Filed: Feb. 28, 2017

(51) Int. Cl.
| G06F 3/06 | (2006.01) |
| G06F 12/1009 | (2016.01) |
| G06F 12/1027 | (2016.01) |
| G06F 9/455 | (2018.01) |

(52) U.S. Cl.
CPC ............ *G06F 3/0616* (2013.01); *G06F 3/064* (2013.01); *G06F 3/0631* (2013.01); *G06F 3/0653* (2013.01); *G06F 3/0664* (2013.01); *G06F 3/0673* (2013.01); *G06F 9/45558* (2013.01); *G06F 12/1009* (2013.01); *G06F 12/1027* (2013.01); *G06F 2009/45583* (2013.01); *G06F 2212/1036* (2013.01); *G06F 2212/151* (2013.01); *G06F 2212/152* (2013.01); *G06F 2212/657* (2013.01)

(58) Field of Classification Search
CPC ............................. G06F 3/0653; G06F 9/45558
See application file for complete search history.

(56) References Cited

U.S. PATENT DOCUMENTS

| 6,799,272 | B1 | 9/2004 | Urata |
| 9,323,552 | B1 | 4/2016 | Adogla et al. |
| 9,798,482 | B1 | 10/2017 | Tsirkin et al. |
| 2005/0010789 | A1 | 1/2005 | Liang |
| 2006/0107320 | A1 | 5/2006 | Bhatt et al. |
| 2009/0113217 | A1 | 4/2009 | Dolgunov et al. |
| 2009/0204824 | A1 | 8/2009 | Lin et al. |
| 2009/0282266 | A1 | 11/2009 | Fries et al. |

(Continued)

OTHER PUBLICATIONS

U.S. Appl. No. 15/280,897, filed Sep. 29, 2016, Titled: Securing Interfaces of a Compute Node.

(Continued)

*Primary Examiner* — Tuan V Thai
*Assistant Examiner* — Alexander J Yoon
(74) *Attorney, Agent, or Firm* — Kilpatrick Townsend & Stockton LLP

(57) ABSTRACT

Disclosed herein are techniques for balancing and reducing the number of write operations performed to each physical memory page of a storage-class memory. In one embodiment, a method includes tracking a count of write operations performed to each physical memory page or subpage of the storage-class memory using a memory management unit, a memory controller, a hypervisor, or an operating system, and selectively allocating physical memory pages of the storage-class memory with the least counts of write operations to a virtual machine or an operating system process using a ranking of the physical memory pages of the storage-class memory determined based at least partially on the count of write operations performed to each physical memory page or subpage of the storage-class memory.

28 Claims, 12 Drawing Sheets

(56) References Cited

U.S. PATENT DOCUMENTS

| | | |
|---|---|---|
| 2010/0153749 A1 | 6/2010 | Sakai |
| 2010/0257331 A1 | 10/2010 | Frank |
| 2011/0026712 A1 | 2/2011 | Ducharme et al. |
| 2011/0099387 A1 | 4/2011 | Gremaud et al. |
| 2013/0166827 A1* | 6/2013 | Cideciyan ........... G06F 12/0246 |
| | | 711/103 |
| 2013/0205139 A1 | 8/2013 | Walrath |
| 2013/0326117 A1* | 12/2013 | Aune ................... G06F 3/0608 |
| | | 711/103 |
| 2014/0298338 A1* | 10/2014 | Doi ....................... G06F 9/4856 |
| | | 718/1 |
| 2015/0113203 A1* | 4/2015 | Dancho ................ G06F 3/0679 |
| | | 711/102 |
| 2015/0229471 A1 | 8/2015 | Nair et al. |
| 2015/0242309 A1* | 8/2015 | Talagala ............... G06F 3/0679 |
| | | 711/103 |
| 2015/0248357 A1 | 9/2015 | Kaplan et al. |
| 2016/0094552 A1 | 3/2016 | Durham et al. |
| 2016/0274814 A1 | 9/2016 | Zhang et al. |
| 2016/0292079 A1* | 10/2016 | Musoll ................ H04L 49/9047 |
| 2018/0095898 A1 | 4/2018 | Khosravi et al. |
| 2018/0150331 A1* | 5/2018 | Chen .................... G06F 9/5077 |

OTHER PUBLICATIONS

U.S. Appl. No. 15/445,190, filed Feb. 28, 2017, Titled: Efficient Memory Management in Multi-Tenant Virtualized Environment.

U.S. Appl. No. 15/445,516, filed Feb. 28, 2017, Titled: Write Minimization for De-Allocated Memory.

\* cited by examiner

| PPN | VPN/Status | Statistics | Trim bit |
|---|---|---|---|
| PPN 1 | VPN 1 | Number of Writes | 0 |
| PPN 2 | Unused | Number of Writes | 1 |
| PPN 3 | VPN 2 | Number of Writes | 0 |
| PPN 4 | Unmapped | Number of Writes | 1 |
| ... | ... | ... | ... |
| PPN N | Unused | Number of Writes | 1 |

| Physical Address | Virtual Address/Status | Statistics | Trim bit |
|---|---|---|---|
| PPN 1 Subpage 1 | VPN 1 Subpage 1 | Number of writes | 0 |
| PPN 1 Subpage 2 | VPN 1 Subpage 2 | Number of writes | 0 |
| PPN 1 Subpage 3 | VPN 1 Subpage 3 | Number of writes | 0 |
| PPN 1 Subpage 4 | VPN 1 Subpage 4 | Number of writes | 0 |
| ... | ... | ... | ... |
| PPN 1 Subpage M | VPN 1 Subpage M | Number of writes | 0 |
| PPN 2 Subpage 1 | Unused | Number of writes | 1 |
| PPN 2 Subpage 2 | Unused | Number of writes | 1 |
| PPN 2 Subpage 3 | Unused | Number of writes | 1 |
| PPN 2 Subpage 4 | Unused | Number of writes | 1 |
| ... | ... | ... | ... |
| PPN 2 Subpage M | Unused | Number of writes | 1 |
| ... | ... | ... | ... |
| PPN N Subpage 1 | VPN K Subpage 1 | Number of writes | 0 |
| PPN N Subpage 2 | VPN K Subpage 2 | Number of writes | 0 |
| PPN N Subpage 3 | VPN K Subpage 3 | Number of writes | 0 |
| PPN N Subpage 4 | VPN K Subpage 4 | Number of writes | 0 |
| ... | ... | ... | ... |
| PPN N Subpage M | VPN K Subpage M | Number of writes | 0 |

TRACKING PERSISTENT MEMORY USAGE

BACKGROUND

High speed, high density, and high endurance memory device are desired in a modern computer system in order to improve the overall performance of the computer system. Dynamic random-access memory (DRAM) has low latency, short access time, and high endurance. However, the size of DRAM in a computer system is generally limited due to, for example, relatively high cost and difficulty in making large DRAM chips or modules. An electrically accessible non-volatile or persistent memory, often referred to as storage-class memory (SCM), that combines the benefits of DRAM, such as high performance and robustness, with the persistent capabilities and low cost of conventional solid-state storage has been developed and is beginning to be used in modern computer systems.

BRIEF DESCRIPTION OF THE DRAWINGS

Various embodiments in accordance with the present disclosure will be described with reference to the drawings, in which:

FIG. 5 illustrates an example tracking table, according to some aspects of this disclosure;

FIG. 6 illustrates an example tracking table, according to some aspects of this disclosure;

DETAILED DESCRIPTION

Figure 1:
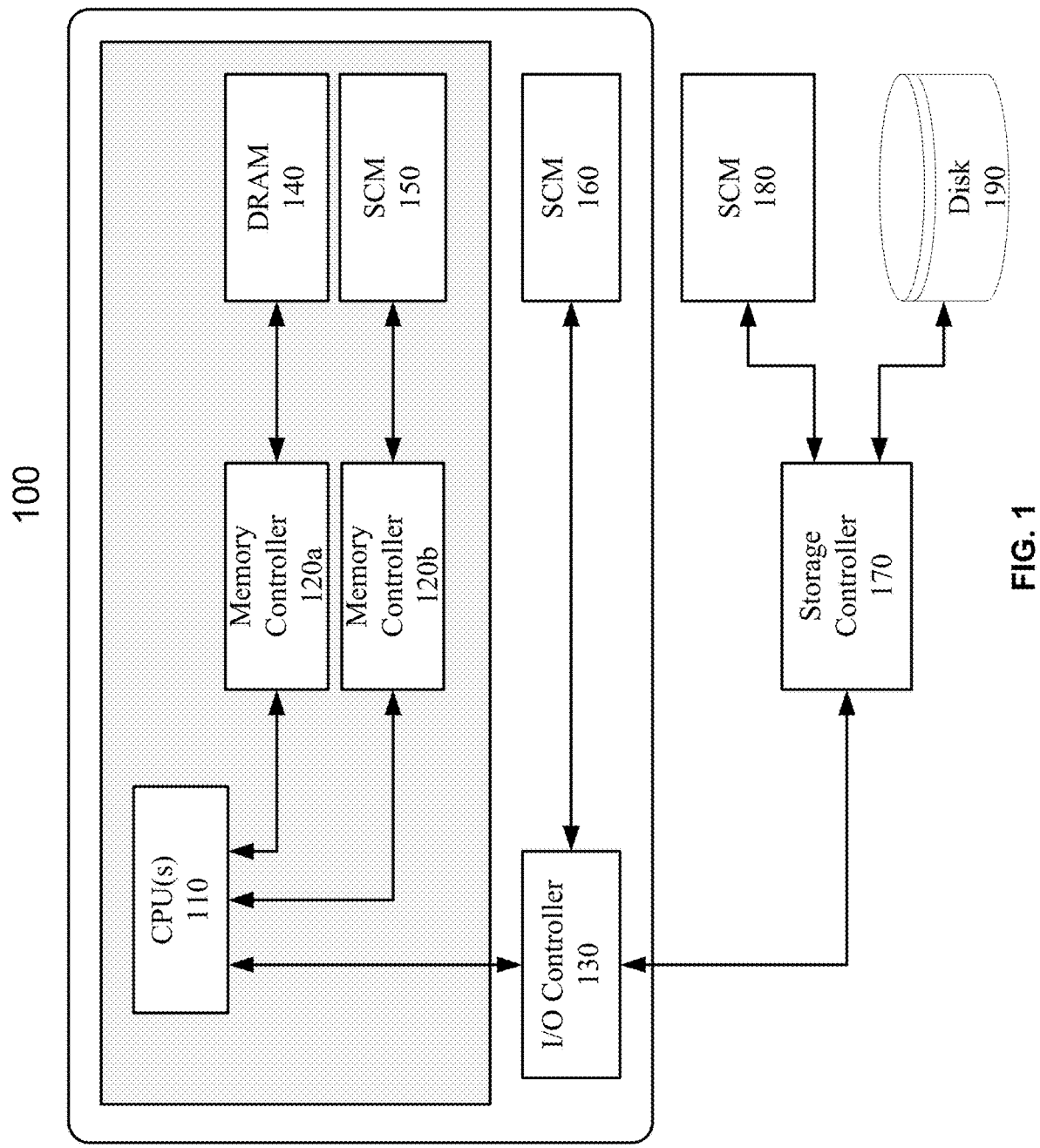
FIG. 1 is a block diagram of an example computer system using storage-class memory, according to some aspects of this disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

One challenge in computer systems is the need for memory technologies that can improve overall performance and reduce cost. Dynamic random-access memory (DRAM) is known for high performance and low capacity, and for being expensive. Thus, a computer system may only have enough DRAM memory space to store a fraction of the total data set that the CPU(s) of the computer system need to operate on. In addition, DRAM memory is volatile, and thus, if the computer system crashes or loses power, data stored in the DRAM memory will be lost. Therefore, most data is kept on storage devices, such as solid-state drives (or disks) (SSDs) or hard disk drives (HDD), which may have higher capacity and lower cost, but a much lower performance than DRAM. Storage-class memory (SCM), is a new hybrid storage/memory tier with particular characteristics. Physically, it may be connected to memory slots in a motherboard like DRAM, and may be managed and accessed like DRAM. While, currently, SCM may be slightly slower than DRAM, it is persistent like traditional storage devices and its content is preserved during power cycles. Therefore, SCM technology may enable a computer system to have a large, high performance, low cost, and persistent memory subsystem.

However, SCMs may have a limited lifetime dictated by the number of write operations, often referred to as program/erase (P/E) cycles, that can be performed on the SCMs. On the other hand, a computer system, such as a server, may receive thousands or millions of read and write requests from users, and thus may require a memory subsystem having a high endurance in order to meet the needs of some write-intensive applications. Thus, for a server using SCM, it is desirable to minimize the write operations to each page or subpage of the memory while meeting the needs of users.

Techniques disclosed herein relate to reducing or minimizing writes to each page or subpage of a memory subsystem using SCM on a computer system. More specifically, in one embodiment, writes to each memory page of the SCM may be tracked, and pages that are not currently being allocated to any virtual machine or Operating System (OS) process, and have the least numbers of write operations may be allocated to a new virtual machine or OS process (e.g., user process or user application), or may be selected as the next write destination. In this way, the number of write operations performed to each page of the memory may be approximately balanced, such that no page would have significantly more writes than other pages or degrade faster than other pages. Therefore, the overall endurance or lifetime of the memory subsystem may be improved.

In another embodiment, when a memory page is de-allocated from a terminated or migrated virtual machine, the memory page or the subpages of the memory page may be marked as "deleted," "trimmed," or "free" in a control table, such that any read to the memory page or subpage will return, for example, an all-0s, all-1s, or random pattern, or any data pattern that does not include user data, even though no physical memory scrubbing (e.g., writing "0s") may have been performed to the memory page or subpages. The de-allocated memory page may not be initialized or scrubbed before it is allocated and/or written to again. In this way, the number of write operations to the memory page or subpage may be reduced. As used herein, "initialization," "scrubbing," and "sanitization" may refer to clearing the content of a memory page by writing, for example, all 0s, all 1s, a random pattern, or any data pattern that does not include user data.

In another embodiment, a de-allocated and then re-allocated memory page or subpage may only be initialized when it is actually about to be written to again by the new virtual machine. Because applications running on a virtual machine may not use all memory pages allocated to the virtual machine, writes to at least some memory pages or subpages may be reduced by only initializing the memory pages or subpages when they are actually about to be written to.

In yet another embodiment, an encryption key and/or scrambling function specific to a virtual machine may be used to control the access to data on the memory page allocated to the virtual machine, and, therefore, a new virtual machine would not be able to access meaningful data on the memory pages previously used by other virtual machines. As such, no initialization may be needed when a de-allocated memory page is reallocated and used. More details of the various embodiments are described below.

A computer system, such as a server, uses memory to store information that it will need immediate access to. It uses storage, on the other hand, to store information that it may currently act on, but does not need at a specific moment in time. Memory, typically DRAM, may have high performance, low capacity, and high cost, and may be volatile. Storage, typically hard disk drives (HDDs) or solid-state drives (SSDs), may have high capacity, affordability, and much lower performance than DRAM, and may be non-volatile. For decades, applications have stored data temporarily in DRAM. At specific execution points, data is typically reformatted and placed into 512-byte or 4096-byte blocks (sometimes referred to as storage sectors), and then written (along with metadata) to disks structured as either file systems or databases for persistence. Ideally, the memory subsystem of a computer system would be sufficiently large to store all the data that will be needed, sufficiently fast for almost immediate data access, non-volatile such that data may not be lost when power is lost, and low-cost to be economically practical.

Storage-class memory, such as some flash or non-flash non-volatile memory (NVM), is a type of memory that has capacity and cost that are similar to storage devices (e.g., HDD) but with performance that is similar to memory devices (e.g., DRAM). SCM combines the benefits of DRAM memory, such as high performance and robustness, with the persistent capabilities and low cost of conventional solid-state or hard-disk magnetic storage. Because SCM is non-volatile, the content stored on it remains in the memory, not only in the case of planned power down or reboots, but also during unplanned crashes and downtime. SCM may be addressed at either a byte or a block level. Because SCM is byte-addressable, there is no need to package data into coherent 512-byte blocks. By keeping the most up-to-date content with byte-level granularity, while eliminating the intermediate copy, SCM may simplify the computer architecture and operating system, greatly improve the performance of the computer system, and give operating systems, software, and/or hypervisor developers significant flexibility. An operating system may initially treat SCM as block storage devices formatted by file systems and databases for compatibility purposes. Hypervisors may map isolated SCM regions directly to different virtual machines (VMs) as either execution memory or a flash-like storage resource, and maintain a memory mapping file or table. It is noted that even though some embodiments in the present disclosure may be described with respect to virtualized environments only, techniques disclosed herein may be used in both virtualized environments and non-virtualized environments. For example, in non-virtualized environments, an OS kernel may map isolated SCM regions directly to different user processes or user applications as either execution memory or a flash-like storage resource, and maintain a memory mapping file or table. The applications or user processes may then access the SCM using the memory mapping file or table.

SCMs may have limited write lifetime, i.e., SCMs may only handle a limited number of write cycles, such as, for example, 1 million or 10 million or less, before wearing out or becoming unusable. The number of write cycles that can be performed on an SCM before the SCM becomes unusable or unreliable may be referred to as "write endurance." Different types of SCM may have different write endurance characteristics. To borrow an example from the endurance of SSDs, Single-Level Cell (SLC) negative-and (NAND) Flash, which uses a single cell to store one bit of data, may provide a relatively high endurance to meet the needs of some write-intensive applications. However, this endurance comes at a higher price, in many cases, prohibitively expensive. On the other hand, Multiple Level Cell (MLC)-based SSDs that use multiple bits per cell to store more bits may cost less, but they may have far lower endurance. Without special treatment, MLC SSDs may not be able to endure the high number of write operations needed for data center workloads. NAND flashes with sub-20 nanometer geometry have shrunk flash sizes to increase density with lower costs. However, shrinking geometries reduce the size of the transistors/gates in the silicon, and the smaller size results in fewer program/erase cycles that the NAND flash can endure.

SCM write endurance may also be described in terms of full Device Writes Per Day (DWPD) for a certain warranty period (typically 3 or 5 years). In other words, if a 100-gigabyte (GB) SSD or SCM device is specified for 1 DWPD, it can withstand 100 GB of data written to it every day for the warranty period. Thus, if a 100-GB SSD or SCM device is specified for 10 DWPD, it can withstand 1 terabyte (TB) of data written to it every day for the warranty period. Another metric that is used for device write endurance is Terabytes Written (TBW), which is used to describe how much data can be written to the device over the lifetime of the drive. The higher the TBW value, the better the endurance of the device. These specifications generally assume that data is written to the device substantially evenly or uniformly, or there is an underlying mechanism, hidden from the user, that will spread the write operations substantially evenly.

FIG. 1 is a block diagram of an example computer system 100 using storage-class memory, according to some aspects of this disclosure. Computer system 100 may include one or more CPUs 110, and one or more memory controllers (120a and 120b) and an input/output (I/O) controller 130 coupled to CPU(s) 110.

Memory controllers 120a and 120b may be used to manage and control the access to the memory subsystem (or main memory) on computer system 100. The memory subsystem (or main memory) may include, for example, DRAM 140 and/or SCM 150. In some embodiments, The memory subsystem may include several levels of cache hierarchy (not shown), such as Level 1 (L1) caches, Level 2 (L2) caches, Level 3 (L3), or last level caches. DRAM 140 may include, for example, dynamic random-access memory (DRAM) or synchronous dynamic random-access memory (SDRAM), such as double data rate (DDR), DDR2, DDR3, or DDR4 SDRAM, of various sizes. SCM 150 may be a random access memory-type non-volatile SCM, such as certain types of resistive RAM memory, that has a read latency of, for example, less than about 1 microsecond (μs). Example of memory-type SCM may include conductive bridging RAM (CBRAM), phase-change memory (PCM), resistive random-access memory (RRAM or ReRAM), or spin-transfer torque (magnetic) random-access memory (STT-RAM or STT-MRAM), etc.

I/O controller 130 may be coupled to a storage controller 170. Storage controller 170 may implement, for example, a Peripheral Component Interconnect (PCI) based protocol, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. For example, storage controller 170 may control a disk 190, which may be, for example, a SCSI, SAS, or ASAT-based hard-drive disk (HDD). Storage controller 170 may also control a storage-type SCM 180, such as a solid-state drive (SSD), using, for example, the NVMe protocol. Storage-type SCM 180 may include, for example, resistive memory.

In some embodiments, an SCM 160 may also be directly connected to I/O controller 130 without going through a storage controller. SCM 160 may include any of the memory-type SCM or storage-type SCM described above, and may have a read latency of, for example, less than 20 μs or less than 10 μs for a block of data.

Figure 2:
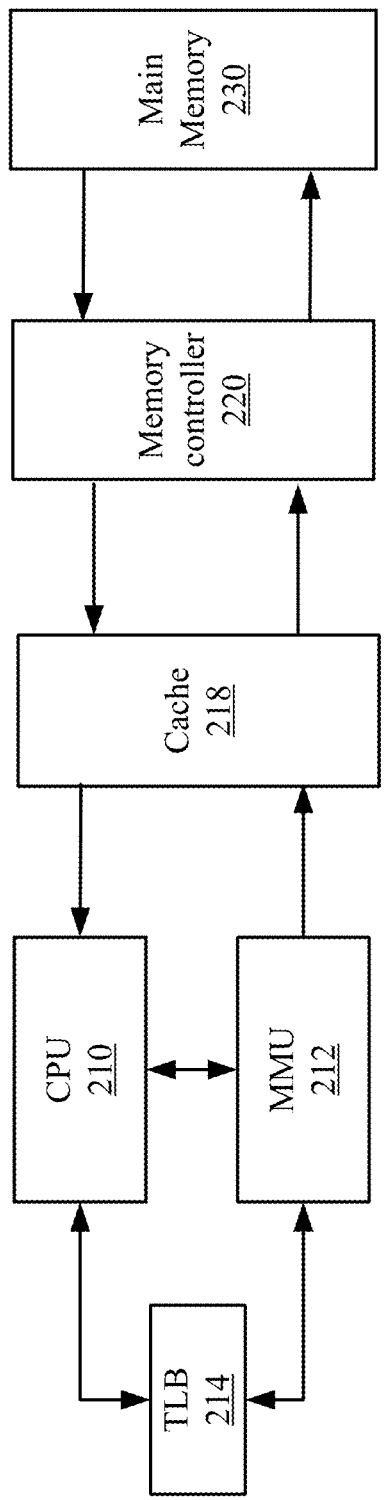
FIG. 2 is a block diagram of an example computer system, according to some aspects of this disclosure.

FIG. 2 is a block diagram of an example computer system 200, according to some aspects of this disclosure. Computer system 200 may include a CPU 210, a cache 218, a memory controller 220, and a main memory 230. Cache 218 may include, for example, a Level 2 instruction cache, a Level 2 data cache, a Level 2 cache, and a Level 3 cache. Main memory 230 may include a random-access memory (RAM), such as a DRAM, of various sizes, or a memory-type SCM as described above. Main memory 230 may be communicatively coupled to a secondary memory (not shown), such as a hard disk, a flash memory, or an optical storage device. Memory controller 220 is a circuit that manages the flow of data going to and from main memory 230. Memory controller 220 may include a direct memory access (DMA) controller for allowing main memory 230 to be accessed independent of CPU 210 such that CPU 210 may be able to perform other functions while main memory 230 is being accessed by other hardware subsystems. Cache 218 and main memory 230 may sometimes be collectively referred to as a physical memory. Even though not shown in FIG. 2, computer system 200 may include two or more instances of main memory 230 and the corresponding memory controllers.

Computer system 200 may be implemented in, for example, a computing node, a server, or a network device. Computer system 200 may be used as a virtual machine in, for example, a cloud computing environment. In a cloud computing environment, a virtual machine running on a physical processing device may use a virtual memory that is mapped to a physical memory. Virtual memory is a memory management technique that can be used for various reasons, including freeing user applications from having to manage a shared memory space, improving security and memory protection due to memory isolation, extending physical memory beyond the main memory, and providing a contiguous address space visible by a process. The operating system of a computer system manages virtual address spaces and the assignment of physical memory to virtual memory. In a computer system using virtual memory, memory addresses used by a program are usually virtual addresses. However, data and instructions are stored in a physical memory, such as DRAMs, SCMs, and caches, using physical memory addresses. Thus, virtual memory addresses used by a program need to be translated into physical addresses for memory access.

In a virtualized environment, a guest operating system on a virtual machine manages guest physical memory by assigning a contiguous guest virtual memory space to an application running on the virtual machine. Only the guest virtual memory is visible to the application. Because a guest operating system is not aware of the virtualization, a hypervisor is also needed to manage host physical memory (machine memory) by mapping the machine memory to the guest virtual or physical memory for a virtual machine. Thus, a two-level memory management unit (MMU) may be needed to map memory addresses between the guest virtual memory and the guest physical memory, and between the guest physical memory and the host physical memory.

The range of addresses used by a specific software process is referred to as a virtual address space. A virtual address space can be divided into pages, each having a page size of, for example, a few kilobytes to a few megabytes. Most MMUs use a page table in the main memory for each process to map virtual page numbers in the virtual address space to physical page numbers in main memory, due to the size of the page table. The page table may include one page table entry (PTE) for each page. Every time the CPU accesses a memory, a virtual address is translated into a corresponding physical address, which may require a walk in the page table for address translation and another physical memory access for the actual data access. Thus, using a page table in the main memory for address translation may not be as fast as desired.

To avoid accessing the main memory every time a virtual address is mapped and thus speeding up the memory access, an MMU may store recent translation results into a translation lookup buffer (TLB). A TLB may be implemented as a content-addressable memory (CAM), where the search key is the virtual page number and the search result is a physical page number. If the requested virtual page number is present in the TLB, a match may be found quickly and the retrieved physical page number can be used to access the physical memory.

For example, computer system 200 shown in FIG. 2 includes an MMU 212 coupled to CPU 210 or integrated into CPU 210. MMU 212 may perform virtual memory management and virtual address translation, and handle memory protection, cache control, and bus arbitration. MMU 212 may be coupled to a TLB 214, which may be used to improve virtual address translation speed. TLB 214 may also be coupled to or integrated into CPU 210 and may include a memory cache that stores recent translations of virtual addresses to physical addresses for faster retrieval of address translations. If a translation can be found in TLB 214, a virtual memory access can execute just as fast as a direct physical memory access. If a translation is not found in TLB 214, CPU 210 may then consult MMU 212 for address translation.

Figure 3:
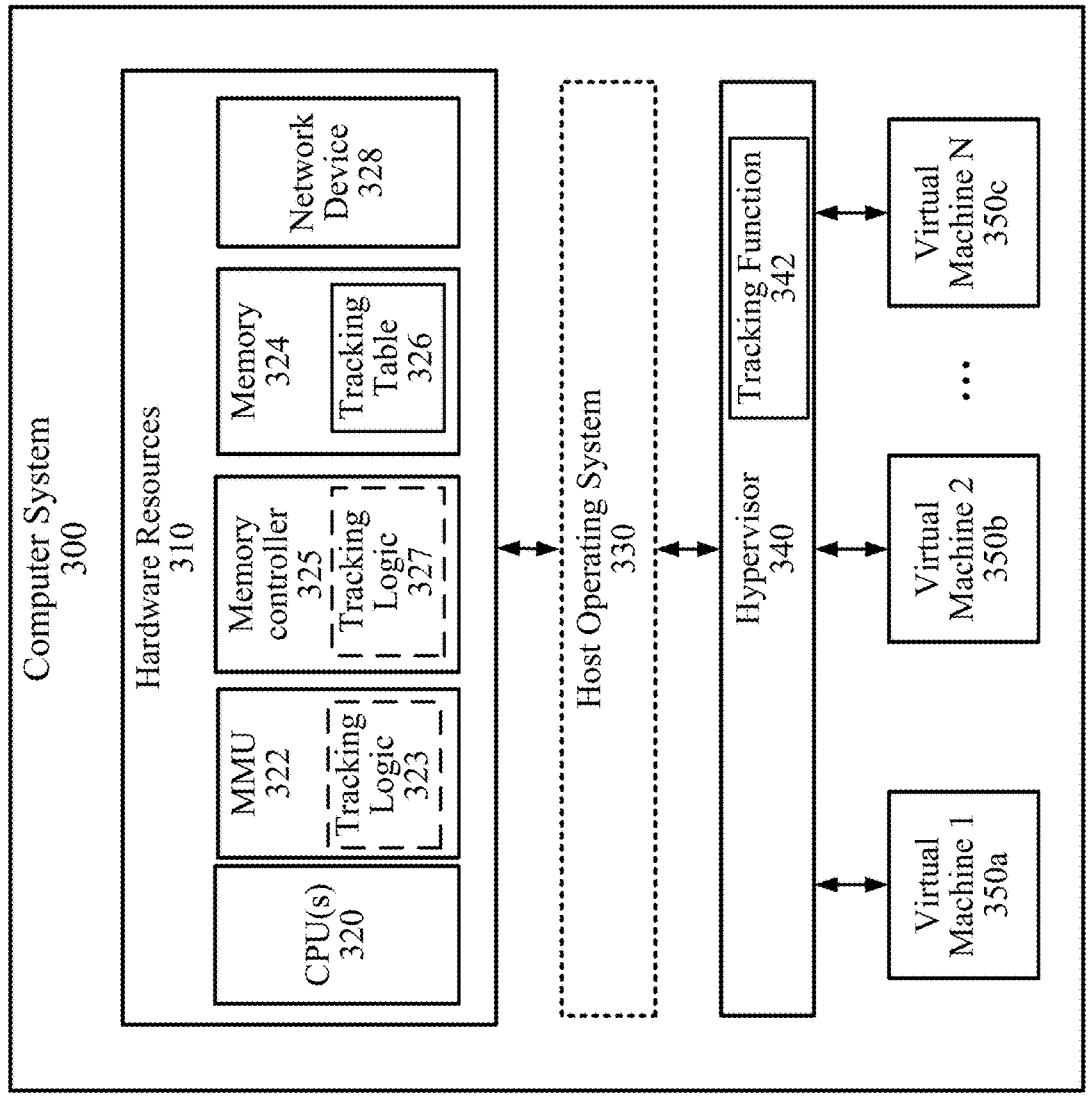
FIG. 3 is a block diagram of an example computer system providing virtual machines to users, according to some aspects of this disclosure.

FIG. 3 is a block diagram of an example computer system 300 providing virtual machines to users, according to some aspects of this disclosure. Computer system 300 may include a host operating system 330 executing on hardware resources 310. Hardware resources 310 may include one or more CPUs 320, memory 324, a memory controller 325, a network device 328, or any suitable components. Hardware resources 310 may also include an MMU 322 for translating the virtual memory addresses to host physical memory addresses as described above with respect to FIG. 2. A hypervisor 340 may execute on host operating system 330 to manage a plurality of virtual machines on computer system 300, such as virtual machine (VM) 1 (350a), VM 2

(350*b*), . . . , and VM N (350*c*), where N is at least one and may be up to, for example, 10 or more, 20 or more, or 100 or more.

Hypervisor 340, also referred to as virtual machine manager (VMM), can emulate multiple virtual devices on a single device in a virtualized environment. Hypervisor 340 can also manage the flow of information between software, the virtualized hardware, and the physical hardware. Hypervisor 340 may be configured to create, start, monitor, stop, or delete each of VMs 1-N (350*a*-350*c*), and may execute at a higher privilege level than VMs 1-N (350*a*-350*c*). In some implementations, hypervisor 340 can manage access controls, resources, scheduling, isolation, etc., for VMs 1-N (350*a*-350*c*) executing their respective guest operating systems (not shown). Hypervisor 340 may be implemented as a software layer or as code embedded in a firmware on computer system 300. Even though hypervisor 340 is shown in FIG. 3 as a type-2 hypervisor (e.g., hosted hypervisor), it will be understood that hypervisor 340 may also be implemented as a type-1 hypervisor (e.g., bare-metal hypervisor), or any other suitable implementation.

Each of VMs 1-N (350*a*-350*c*) may be any suitable emulation of a computer system that may be managed by hypervisor 340. Each of VMs 1-N (350*a*-350*c*) can run an independent operating system and one or more applications or processes on hardware resources 310. For example, in some instances, VMs 1-N (350*a*-350*c*) may perform a write operation to store data in memory 324, or a read operation to read data stored in memory 324. As described above with respect to FIGS. 1 and 2, memory 324 may include DRAM, SDRAM, SCM, or any other suitable memory.

Two or more VMs from VMs 1-N (350*a*-350*c*) may execute simultaneously or in any order on computer system 300. For example, in some instances, at a given time, VMs 1-N (350*a*-350*c*) may execute simultaneously on computer system 300. In some instances, VMs 1-N (350*a*-350*c*) may execute on computer system 300 one at a time. For example, hypervisor 340 may create and start VM 1 (350*a*) for a first user. After the user finishes running applications or processes on VM 1 (350*a*), hypervisor 340 may stop and delete VM 1 (350*a*), and create and start VM 2 (350*b*) for a second user, and so on.

Generally, before a VM from VMs 1-N (350*a*-350*c*) starts executing, hypervisor 340 may allocate a certain portion of memory 324 to that VM. As an example, hypervisor 340 may allocate a first VM memory to the VM 1(350*a*) when VM 1 (350*a*) is created or before VM 1 (350*a*) starts executing. The first VM memory may correspond to a first physical memory space in memory 324. When VM 1 (350*a*) is terminated, migrated, or has been inactive for an extended period of time, the first physical memory space used by VM 1 (350*a*) may be de-allocated from VM 1 (350*a*) and allocated to another VM, e.g., VM 2 (350*b*), when VM 2 (350*b*) is created and initiated.

Since the first physical memory space was previously used by VM 1 (350*a*), the first physical memory space may still store data associated with VM 1 (350*a*). Because different VMs may store data comprising sensitive information for different users in the physical memory that may be shared by the different users, exposure of the user data among different VMs may not be desirable. Thus, for security reasons, hypervisor 340 may sanitize (or scrub) the first VM memory (physically, the first physical memory space) before it can be released to and used by VM 2 (350*b*). For example, in some implementations, hypervisor 340 may sanitize the first physical memory space with random patterns, all zeros or all ones to obscure the previously stored data associated with VM 1 (350*a*). In some implementations, hypervisor 340 may sanitize the first physical memory space after VM 1 (350*a*) has migrated, terminated, or has been inactive for an extended period of time so that the first physical memory space can be used by the other VMs without exposing the data associated with the VM 1 (350*a*). In some implementations, hypervisor 340 may initialize the first physical memory space after the first physical memory space is allocated to a new VM. The sanitization of the memory after the termination of a previous VM and/or the initialization of the memory before a subsequent VM starts may result in extra write cycles to memory 324. When memory 324 is implemented using an SCM that has a limited write endurance, these extra cycles to sanitize or initialize the allocated memory space in memory 324 can be highly undesirable and may degrade the performance of memory 324.

As described above with respect to FIG. 2, when hypervisor 340 allocates physical memory to a VM, it may maintain a memory mapping table or page table that maps virtual memory pages for different VMs to pages in physical memory 324, such that, when CPU(s) 320 needs to access a virtual memory address, MMU 322 may translate the virtual memory address to a corresponding physical memory address based on page table, so that CPU(s) 320 may actually access the corresponding physical memory address to read or write data. In some embodiments, the page table may be a shadow page table.

Figure 4:
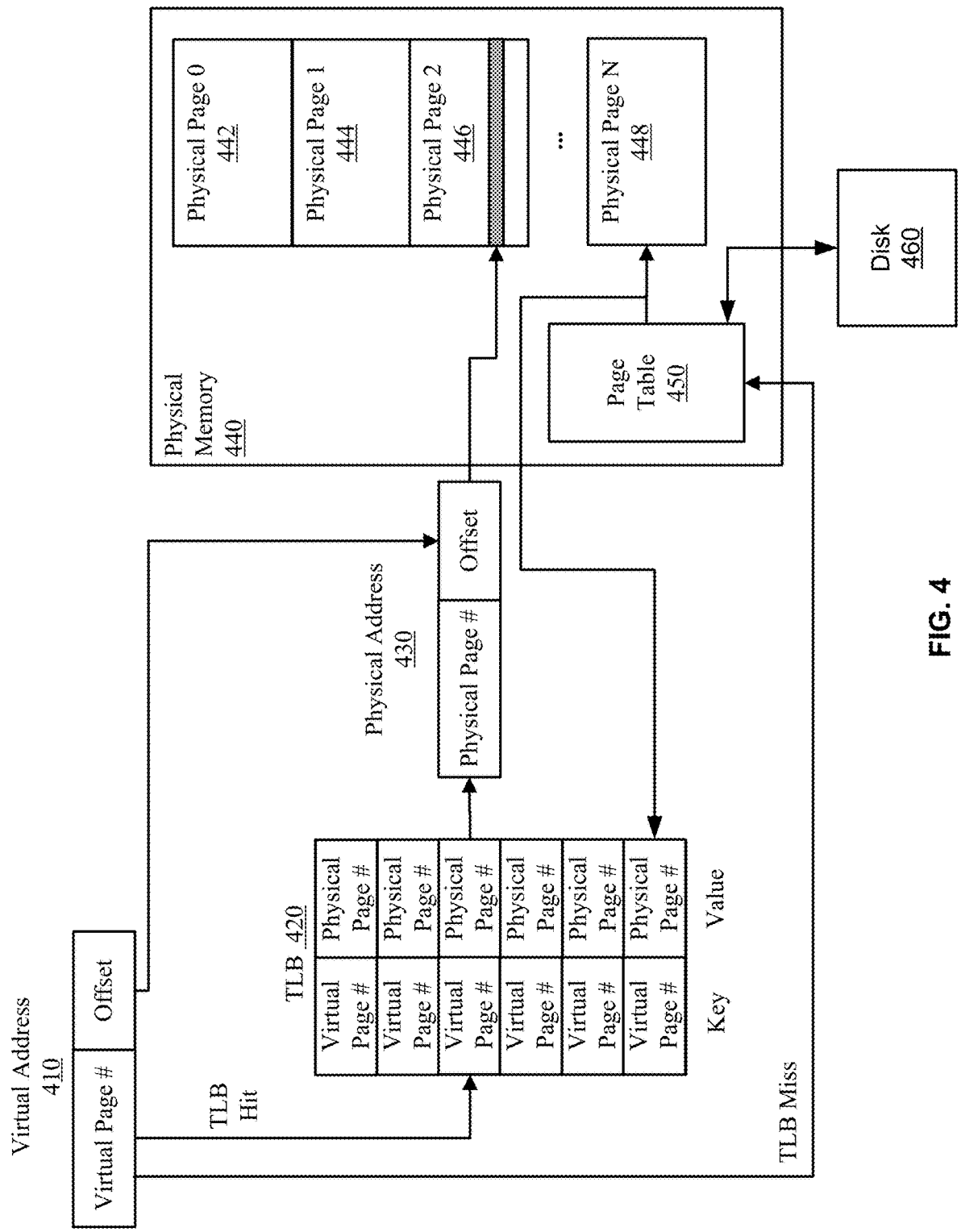
FIG. 4 is a block diagram illustrating example physical memory access flows by a virtual machine, according to some aspects of this disclosure.

FIG. 4 is a block diagram illustrating example physical memory access flows by a virtual machine, according to some aspects of this disclosure. A virtual address, for example, virtual address 410, may include a virtual page number, which is typically the upper virtual address bits, and an offset number (the bottom bits of the address) that specifies the offset within a page. To access virtual address 410, an MMU, such as MMU 212, may search TLB 420 for an entry that includes the virtual page number being accessed. If a TLB entry with a matching virtual page number is found, a TLB hit event occurs and the corresponding physical page number can be used with the offset number to determine the target physical address 430. Physical address 430 can then be used to access corresponding physical page 2 (446) in physical memory 440, which may include other physical pages, such as physical page 0 (442), physical page 1 (444), physical page N (448), and a page table 450.

If there is no TLB entry with a matching virtual page number in any TLB, a TLB miss event occurs. When a TLB miss event occurs, the MMU may walk through page table 450 to find a matching page table entry (PTE). If the matching PTE can be found, the MMU may load the matching PTE in the TLB. For example, the matching PTE may point to physical page N 448, and the matching PTE may be loaded into TLB 420. A TLB miss may also be handled by a software TLB miss handler, which may walk through the page table to find a matching PTE.

If no matching PTE is found in page table 450, a page fault event occurs, which may indicate that the virtual address is invalid or the requested page is not loaded in the physical memory. The page fault is generally handled by a part of the operating system kernel. When handling a page fault, the operating system generally tries to make the requested page accessible in physical memory, or terminates the process in case of an illegal memory access. A page fault handler may also search in a secondary storage, such as a hard disk 460, to find the requested page, which may then be loaded into the physical memory. Page table 450 and TLB 420 may then be updated accordingly.

In some embodiments, in order to minimize the write operations to an SCM, such as SCM 150 or memory 324 that may be persistent, hypervisor 340, MMU 322, memory controller 325, or other entities of computer system 300 may track the number of write operations performed to each physical memory page via, for example, MMU 322 and/or a memory controller, such as memory controller 220 of FIG. 2, by using a tracking table 326 stored in memory 324, which may be a page table as described above with respect to FIG. 2 and FIG. 4, a modified version of the page table, or a different table. A number or count of write operations may be associated with each physical memory page. In this way, the cumulative number of write operations to the physical memory page during the lifetime of the memory or the memory page may be tracked even if the physical memory page has been allocated to many different VMs. For example, when MMU 322 and/or a memory controller receives a request to write to a mapped physical memory page by a first VM, the number of write operations to the particular physical memory page may be increased by one. When the physical memory page is de-allocated from the first VM, re-allocated to a second VM, and being written by the second VM, the number of write operations to the particular physical memory page may be increased by one.

As described above, the tracking may be performed by hypervisor 340, MMU 322, memory controller 325, or other entities of computer system 300. For example, in some embodiments, a tracking function 342 may run on the hypervisor to track the number of write operations performed to each physical memory page or the status of each physical memory page, such as whether the physical memory page has been allocated to a virtual machine or is unused. In some embodiments, the tracking may be performed by a tracking logic 323 in MMU 322. For example, when a write request is sent to MMU 322, MMU 322 may translate the virtual memory address into the physical memory address, and tracking logic 323 may increase the number of write operations performed to the physical memory page corresponding to the physical memory address in tracking table 326 by 1. In some embodiments, the tracking may be performed by a tracking logic 327 in memory controller 325. For example, when a write operation is performed to a physical memory page via memory controller 325, tracking logic 327 may increase the number of write operations performed to the physical memory page stored in tracking table 326 by 1.

In some embodiments, based on the number of write operations performed to each physical memory page, hypervisor 340 may select and allocate some available physical memory pages for a new VM. For example, hypervisor 340 may rank or order the available physical memory pages based on the number of write operations performed to each physical memory page, and select and allocate physical memory pages with the least numbers of write operations to a new VM. Note that, because of the virtualization, a virtually contiguous virtual memory may be provided to a VM even though the physical memory pages allocated to the VM may not be contiguous. In some embodiments, MMU 322, memory controller 325, or other circuits of computer system 300 may rank or order the available physical memory pages based on the number of write operations performed to each physical memory page.

In many instances, a VM may not actually use all the physical memory pages allocated to the VM. Therefore, in some embodiments, based on the number of write operations performed to each physical memory page allocated to a VM, hypervisor 340 may map a virtual memory page that is to be written for the first time by the VM to a physical memory page that has the least number of write operations performed to it. Thus, data may first be written into the allocated physical memory page that has the least number of write operations.

In some embodiments, when a physical memory page is de-allocated, hypervisor 340 may mark or label the memory page as "deleted" or "trimmed" (e.g., set a trim bit to "1") in tracking table 326 stored in memory 324, such that any read to the memory page will return all "0s," all "1s," or a random pattern, even though no physical memory scrubbing (writing "0s" or other pattern) may have been performed on the memory page. The de-allocated memory page may not need to be sanitized or scrubbed before it is allocated again. In this way, the number of write operations to the memory page may be further reduced.

In a non-virtualized environment, an operating system, MMU, memory controller, or other entities of a computer system may track the number of write operations performed to each physical memory page by using a tracking table stored in a persistent memory. Based on the number of write operations performed to each physical memory page, the operating system, MMU, or memory controller may select and allocate some available physical memory pages for a new operating system process. For example, the operating system, MMU, or memory controller may rank or order the available physical memory pages based on the number of write operations performed to each physical memory page, and select and allocate physical memory pages with the least numbers of write operations to the new operating system process.

FIG. 5 illustrates an example tracking table 500, according to some aspects of this disclosure. As shown in FIG. 5, tracking table 500 may include a plurality of entries. As described above, in some embodiments, tracking table 500 may be a page table or a modified page table. Each entry may correspond to a physical page number (PPN), and may include the corresponding virtual page number (VPN) that the PPN is mapped to, and/or the status of the PPN (e.g., "unused" if it is not currently allocated to a VM or "unmapped" if it is allocated to a VM but is not mapped to a VPN). Each entry may also include statistical data, such as the accumulative number of write operations that have been performed to the physical page. In some embodiments, the statistical data may also include a count of defects of each physical memory page (e.g., known manufacturing defects or defects detected during run time) and/or a read or write error rate of each physical memory page. Tracking table 500 may be stored in a persistent physical memory such as an SCM. Because the physical memory may be an SCM that is persistent, the accumulative number of write operations that have been performed to the physical page may be tracked and kept in the SCM during the life time of the SCM.

As shown in the FIG. 5, in some embodiments, each entry in tracking table 500 may also include a field indicating whether the physical memory page is trimmed. A physical memory page may be marked or labeled as "trimmed" when it is de-allocated from a VM by, for example, setting the trim bit to "1". If a VM tries to access a virtual memory page mapped to the physical memory page that is labeled as trimmed, when the virtual memory page is translated to the physical memory page by, for example, the MMU using tracking table 500, at least one of the hypervisor, the MMU, or the memory controller may read the trim bit, and may return an all "0s," all "1s," or random pattern to the VM, even though the physical memory page still stores data previously used by another VM.

When a physical memory page that is labeled as trimmed is allocated to a new VM, the hypervisor may reset the trim bit, for example, by setting "0" in the field, such that the page may be initialized before the write, or the page mat be written with data associated with the new VM to overwrite the existing data without initialization. In some embodiments, the hypervisor may reset the trim bit for a physical memory page only when the new VM is about to write to the physical memory page.

It is noted that even though FIG. 5 shows the virtual page number, the status, the number of writes, and the trim bit for a physical page number in a single table, in different implementations, any of these fields may be optional. A tracking table may include the physical page number and at least one of the virtual page number, the status, the number of writes, or the trim bit for the physical page number. For example, in a non-virtualized environment, the tracking table may not include the virtual page numbers. In some embodiments, different tracking tables may be created and maintained for mapping or for storing the statistical data or status information. For example, a separate control table may be created and maintained for storing the trim bit for each physical page number.

Furthermore, in many cases, a memory page (e.g., 1-kbyte, 4-kbyte, or 8-kbyte page) may not be as fully utilized. For example, in some cases, less than 512-byte data may be written to a memory page, while the rest regions of the memory page may not have been used by a VM. In addition, as discussed above, the SCM (and DRAM) may be byte-addressable. Therefore, in some embodiments, the statistical data and status information of the physical memory page may be tracked on a subpage level. For example, a 4-kbyte page may include 8 512-byte subpages, and the statistical data and status information for each of the 8 subpages may be tracked individually.

FIG. 6 illustrates an example tracking table 600, according to some aspects of this disclosure. Tracking table 600 may include a plurality of entries, where each entry may correspond to a subpage, rather than a page, of the physical memory. Tracking table 600 may be stored in a persistent physical memory such as an SCM. As described above, in some embodiments, tracking table 500 may be a page table or a modified page table. As tracking table 500, each entry in tracking table 600 may include a PPN and a subpage number, and the corresponding VPN and subpage that the subpage of the PPN is mapped to, or the status of the subpage of the PPN (e.g., "unused" if the PPN is not currently allocated to a VM, or "unmapped" if the PPN is allocated to a VM but is not mapped to a VPN). Each entry may also include statistical data such as the accumulative number of write operations that have been performed to a physical page or the subpage of the physical page. In some embodiments, the statistical data may also include a count of defects of each physical memory page or subpage (e.g., known manufacturing defects or defects detected during run time) and/or a read or write error rate of each physical memory page or subpage. Because the physical memory may be an SCM that is persistent, the accumulative number of write operations that have been performed to the subpage of the physical page may be tracked and kept in the SCM during the life time of the SCM. For example, a physical memory page of 4-kbyte may include 8 512-byte subpages, and the number of write operations performed to each subpage of the physical memory page may be tracked.

In some cases, the number of write operations performed to each subpage of the physical memory pages may not be substantially even or uniform. For example, in one case, the total number of write operations performed to a first physical memory page in the page-level granularity may be about 8000 (assuming that each write operation only writes to one subpage of the first physical memory page), where the number of write operations performed to each of the 8 subpages of the first physical memory page may be, for example, about 1000. In other words, the maximum number of write operations performed to any subpage among the subpages of the first physical memory page is about 1000. In another case, the total number of write operations performed to a second physical memory page in the page-level granularity may be about 7000, where the numbers of write operations performed to the 8 subpages of the second physical memory page may be, for example, about 3000, 500, 500, 1000, 500, 500, 400, and 600, respectively. Therefore, the maximum number of write operations performed to any subpage among the subpages of the second physical memory page is about 3000. As such, even though the first physical memory page may have a higher total number of write operations (8000) performed to it than the second physical memory page (7000) in the page-level granularity, the first physical memory page may be able to endure more future write operations than the second physical memory page because the first subpage of the second physical memory page may fail earlier due to the larger number of write operations (3000) performed to the first subpage than the other subpages caused by uneven or imbalanced write operations on the second physical memory page.

As shown in the FIG. 6, in some embodiments, each entry in tracking table 600 may also include a field indicating whether the subpage of the physical memory page is trimmed. A subpage of the physical memory page may be marked or labeled as "trimmed" when it is de-allocated from a VM by, for example, setting the trim bit to "1". If a VM tries to access a subpage of a virtual memory page mapped to a subpage of a physical memory page that is labeled as trimmed, when the virtual memory address is translated to the physical memory address by, for example, the MMU using tracking table 600, at least one of the hypervisor, the MMU, or the memory controller may read the trim bit, and may return an all "0s," all "1s," or random pattern to the VM, even though the physical memory page still stores data previously used by another VM.

When the page is allocated to a VM and the VM tries to write to a subpage of a virtual memory page mapped to a subpage of a physical memory page that is labeled as trimmed, the hypervisor may reset the trim bit, for example, by setting "0" in the field, such that the subpage may be initialized before the write, or be written with data associated with the VM to overwrite the existing data without initialization.

It is noted that even though FIG. 6 shows the virtual page number and subpage number, the number of writes, and the trimmed status for a physical page number and a subpage number, in different implementations, a tracking table may include the physical page number and the subpage number, and at least one of the virtual page number and the subpage number, the number of writes, or the trimmed status for the physical page number and the subpage number. In some embodiments, different tracking tables may be created and maintained for mapping, for storing the statistical data, or for storing the status information. For example, a tracking table may be created and maintained for storing the statistical data (e.g., the numbers of write operations), and a separate control table may be created and maintained for storing the trim bit for each physical page number or subpage number. In some embodiments, a tracking table may store the statistical data on the page level, and store the status information (e.g., trim bits) on the subpage level.

In some embodiments, the hypervisor may keep a table for the physical memory. In some embodiments, the hypervisor may keep a table for each block of the physical memory. In some embodiments, the hypervisor may keep a separate tracking table for each active VM.

Information stored in tracking table 500 or 600 may be used by the hypervisor, the MMU, or the memory controller to minimize writes to a memory page or a subpage using various techniques described in detail below.

As described above, in various embodiments, writes to each page of the SCM may be tracked, and pages that are not currently being allocated to any virtual machine or OS process and have the least accumulative numbers of write operations may be allocated to a new VM or OS process. In this way, the number of write operations to each page of the memory may be substantially the same, such that no page would have significantly more writes than other pages or degrade faster than other pages. Therefore, the overall endurance or lifetime of the memory subsystem may be improved.

Figure 7:
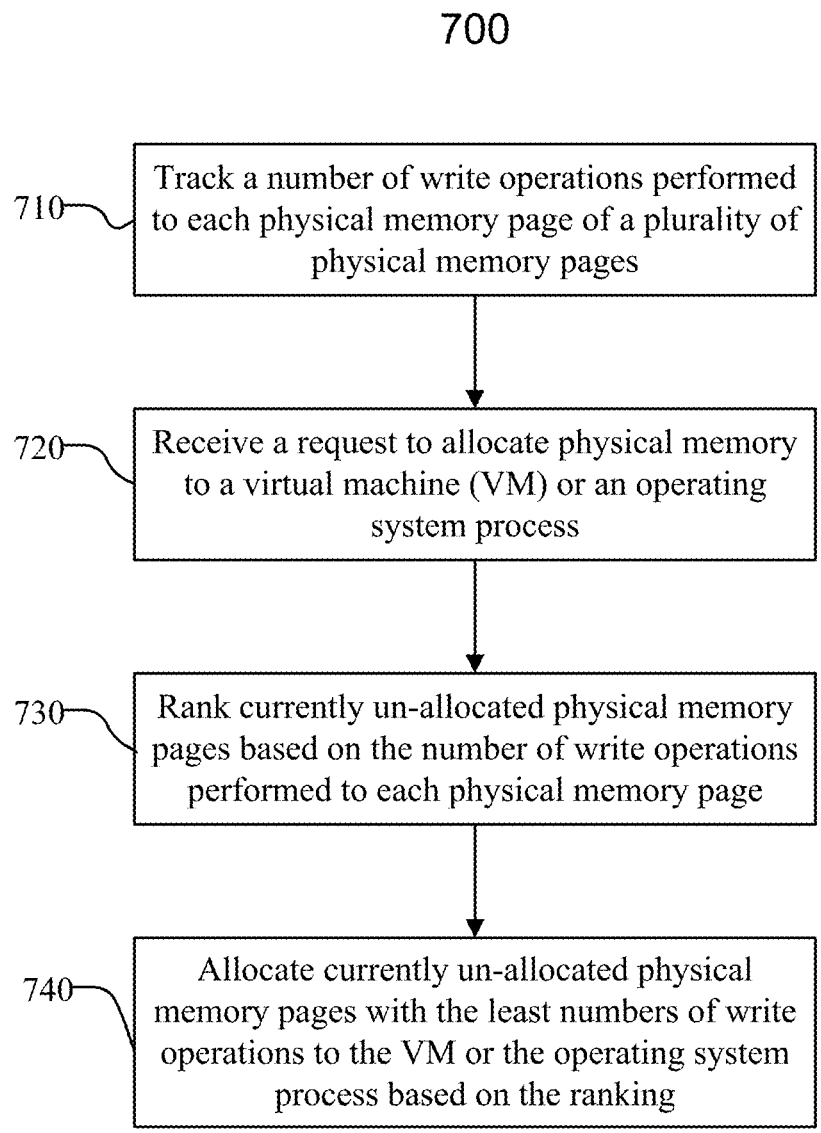
FIG. 7 is a flow chart illustrating an example process, according to some aspects of the present disclosure.

FIG. 7 is a flow chart illustrating an example process 700, according to some aspects of the present disclosure. Process 700 may be performed by at least one of a hypervisor, such as hypervisor 340 of FIG. 3, an operating system, an MMU (e.g., MMU 212 or 322), or a memory controller (e.g., memory controller 220).

At block 710, the hypervisor, operating system, MMU, or memory controller may track a number of write operations performed to each physical memory page of a plurality of physical memory pages. For example, as described above, the hypervisor may maintain a tracking table, such as tracking table 500 or 600, that includes the cumulative number of write operations to each physical memory page. When a VM needs to write data to a virtual memory address, the virtual memory address that includes a virtual memory page number and an offset may be translated into the physical memory address that includes a physical memory page number and an offset by, for example, the MMU, using a page table. The cumulative number of write operations for the physical memory page may be increased by one. The tracking table that stores the number of write operations performed to each physical memory page of the plurality of physical memory pages may be stored in an SCM that is non-volatile or persistent. In some embodiments, the MMU or memory controller may track the number of write operations performed to each physical memory page of the plurality of physical memory pages.

At block 720, a request to allocate physical memory to a new VM or operating system process may be received, for example, by the hypervisor from a user, by the memory controller from the hypervisor, or by the memory controller from the operating system, or may be detected by the memory controller based on a request to write to a trimmed or unallocated physical memory page. For example, to instantiate a new VM, physical memory pages may need to be allocated to the VM. In some cases, a VM may require 512-Mbyte, 1-GB, 16-GB, or more memory to be allocated to the VM. The hypervisor may assign a contiguous virtual memory space to the VM, but the physical memory that is allocated to the VM may not need to be contiguous.

At block 730, the hypervisor, an application running on the hypervisor, the operating system, the MMU, or the memory controller may order or rank currently un-allocated physical memory pages based on the number of write operations performed to each physical memory page stored in the tracking table. For example, the hypervisor may identify the unused physical memory pages based on the status information (e.g., "unused") in the tracking table, and rank the unused physical memory pages based on the corresponding numbers of write operations. In some embodiments, the hypervisor may receive the numbers of write operations performed to the physical memory pages from, for example, the MMU or the memory controller, and perform the ranking. The physical memory pages that have the least numbers of write operations may have the highest ranks, or, in some implementations, the lowest ranks. In some implementations, a circuit, such as the MMU or the memory controller, may perform the ranking at a higher speed and, in some cases, in real time. In some embodiments, the ranking may be performed by the MMU or the memory controller, and then provided to the hypervisor. In some embodiments, the ranking may also be based on, for example, a count of defects of each physical memory page (e.g., known manufacturing defects or defects detected during run time) and/or a read or write error rate of each physical memory page, in addition to the number of write operations performed to each physical memory page. For example, in some embodiments, a physical memory page that has more defects or a higher read/write error rate may be ranked lower than another physical memory page that has a similar number of write operations. In some embodiments, a physical memory page with defects or a read/write error rate higher than a threshold value may not be allocated to any VM or operating system process.

At block 740, the hypervisor, the operating system, the MMU, or the memory controller may allocate the currently un-allocated physical memory pages with the least numbers of write operations to the VM or the operating system process based on the ranking. For example, if a VM requires 512-Mbyte memory and each physical memory page includes 4-kbyte, the hypervisor may select 128,000 un-allocated physical memory pages that have the highest ranks and allocate these 128,000 physical memory pages to the VM. The hypervisor may then update the status of each of the 128,000 physical memory pages from "unused" to the virtual memory page number that each of the 128,000 physical memory pages is mapped to. When the VM writes to a virtual memory address, the number of write operations to the physical memory page corresponding to the virtual memory address may be increased by one as described above. In some embodiments, the MMU or the memory controller may allocate the currently un-allocated physical memory pages to the VM or the operating system process without the involvement of the hypervisor or the operating system.

As described above with respect to FIG. 6, in some embodiments, the accumulative number of write operations that have been performed to each subpage of the physical memory pages may be tracked and kept in the SCM. As also discussed with respect to FIG. 6, in some cases, even though a first physical memory page may have a higher total number of write operations performed to it than a second physical memory page, the first physical memory page may still be able to endure more future write operations than the second physical memory page due to uneven or imbalanced write operations performed to subpages of the second physical memory page. In some embodiments where the accumulative number of write operations that have been performed to each subpage of the physical memory page has been tracked, the hypervisor, the application running on the hypervisor, the OS, the MMU, or the memory controller may, additionally or alternatively, order or rank currently un-allocated physical memory pages based on a maximum count of write operations performed to a subpage among subpages of each physical memory page. For example, in the examples discussed above with respect to FIG. 6, even though the total number of write operations performed to the first physical memory page is about 8000 while the total number of write operations performed to the second physical memory page is about 7000 (less than 8000), the maximum count of write operations performed to a subpage among the 8 subpages of the first physical memory page is about 1000, while the maximum count of write operations performed to a subpage among the 8 subpages of the second physical memory page is about 3000. As such, the first physical memory page may have a higher ranking (in write endurance) than the second physical memory page because of the lower maximum count of write operations performed to a subpage among the subpages of the first physical memory page. Therefore, the first physical memory page may be selected over the second physical memory page to be allocated to the VM or OS process.

As described above, in some instances, a VM may not use all the physical memory pages allocated to the VM. Therefore, in some embodiments, based on the number of write operations performed to each physical memory page allocated to a VM, hypervisor 340 may map a virtual memory page to be written for the first time by the VM to a physical memory page that has the least number of write operations. In other words, data may first be written by the VM into the physical memory page that has the least number of write operations.

Figure 8:
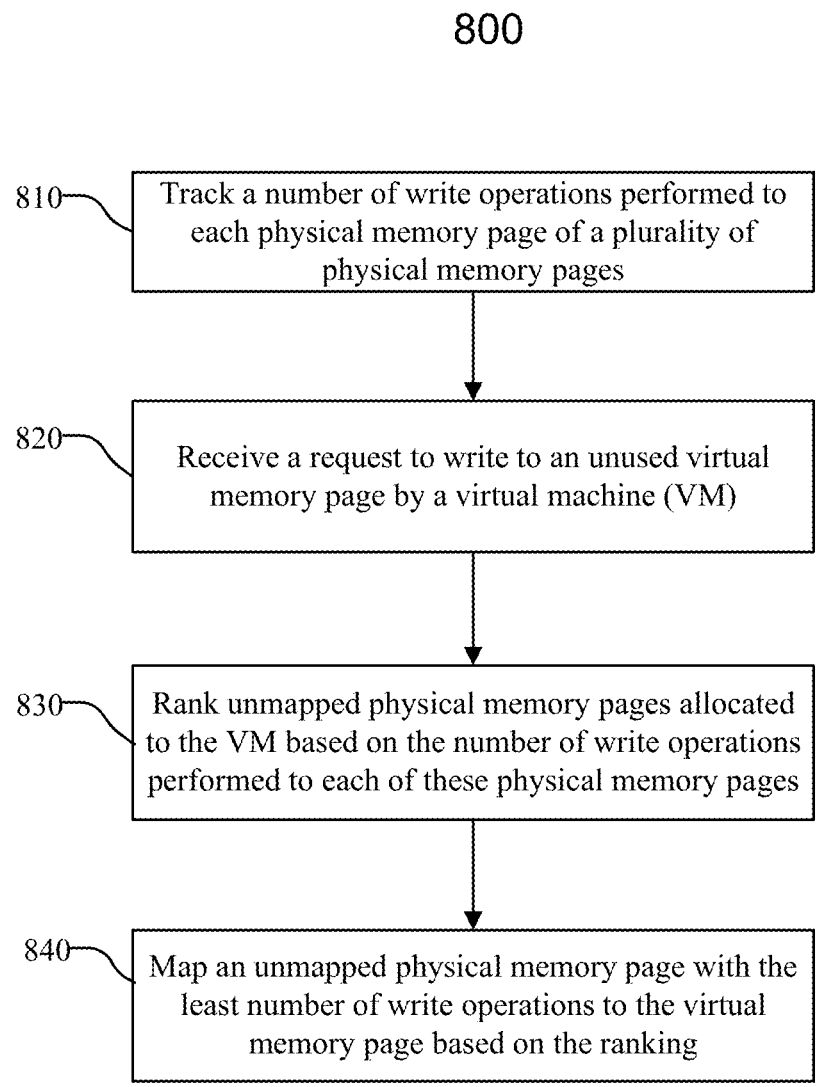
FIG. 8 is a flow chart illustrating an example process, according to some aspects of the present disclosure.

FIG. 8 is a flow chart illustrating an example process 800, according to some aspects of the present disclosure. Process 800 may be performed by a hypervisor, such as hypervisor 340 of FIG. 3, an MMU (e.g., MMU 212 or 322), or a memory controller (e.g., memory controller 220), or other circuits of a computer system.

At block 810, the hypervisor may track a number of write operations performed to each physical memory page of a plurality of physical memory pages in the physical memory of a computer system, as described above with respect to block 710 of FIG. 7. The tracked accumulative number of write operations performed to each physical memory page may be stored in a persistent memory. When a new VM is instantiated, the hypervisor may allocate unused physical memory pages to the new VM as described above with respect to FIG. 7.

At block 820, the hypervisor, MMU, or memory controller may receive a request to write to a virtual memory page by a VM, where the virtual memory page may be used the first time for the VM and has not been mapped to a physical memory page yet. The request may be received with a virtual memory address that includes a virtual memory page number and an offset in the page. The request may be received by the hypervisor from the VM, by the memory controller from the hypervisor, or by the memory controller from the operating system, or may be detected by the memory controller or MMU based on a request to write to an unmapped virtual or physical memory page.

At block 830, the hypervisor, an application running on the hypervisor, the MMU, or the memory controller may order or rank the unmapped physical memory pages allocated to the VM based on the number of write operations performed to each of these physical memory pages. As described above, the number of write operations for each physical memory page may be stored in a tracking table, such as tracking table 500 or 600. The hypervisor may identify the unmapped physical memory pages among the physical memory pages allocated to the VM based on the status information (e.g., "unmapped") in the tracking table, and rank the unmapped physical memory pages based on the corresponding numbers of write operations. The physical memory page that has the least number of write operations may have the highest rank, or, in some implementations, the lowest rank. In some implementations, a circuit, such as the MMU or the memory controller, may perform the ranking at a higher speed and, in some cases, in real time, and provide the ranking to the hypervisor.

At block 840, the hypervisor, MMU, or memory controller may select and map an unmapped physical memory page with the least number of write operations to the virtual memory page. The hypervisor, MMU, or memory controller may then update the entry in the tracking table that corresponds to the selected unmapped physical memory page with the mapping information and the updated number of write operations (increased by 1) for the selected physical memory page. In this way, the least-written physical memory page may be used first for a VM.

Although the technique described above with respect to FIG. 8 relates to selecting a physical memory page for a virtual machine, a skilled person would understand that similar technique may be used to select a physical memory page for an operating system process in a non-virtualized environment. For example, as described above with respect to FIG. 7, similar technique as described above with respect to FIG. 8 may be performed by an operating system, an MMU, or a memory controller in the non-virtualized environment.

By combining the techniques described above with respect to FIG. 7 and FIG. 8, the least-written un-allocated physical memory pages may be allocated to a new VM or OS process, and among the physical memory pages allocated to the new VM or OS process, the least-written physical memory page may be written first. As a result, the least-written physical memory page in the memory may be written first, and thus the number of write operations for each physical memory page in the memory may be more balanced or uniform.

It is noted that although the technique described above with respect to FIG. 8 relates to selecting a physical memory page, a skilled person would understand that the technique may be used to select a subpage of a physical memory page if the number of write operations to each subpage of each physical memory page is tracked and kept in a tracking table as the example tracking table 600 shown in FIG. 6.

For example, in some embodiments where the accumulative number of write operations that have been performed to each subpage of the physical memory pages has been tracked, the hypervisor, the application running on the hypervisor, the MMU, or the memory controller may, additionally or alternatively, order or rank the unmapped physical memory pages that have been allocated to the VM, based on a maximum count of write operations performed to a subpage among the subpages of each physical memory page. For example, in the examples described above with respect to FIG. 6, even though the total number of write operations performed to the first physical memory page is about 8000 while the total number of write operations performed to the second physical memory page is less than 8000 (e.g., 7000), the maximum count of write operations performed to a subpage among the 8 subpages of the first physical memory page is about 1000, while the maximum count of write operations performed to a subpage among the 8 subpages of the second physical memory page is about 3000. As such, the first physical memory page may have a higher ranking than the second physical memory page because of the lower maximum count of write operations performed to a subpage among the subpages of the first physical memory page. Therefore, the first physical memory page may be selected over the second physical memory page to be mapped to the virtual memory page.

In some embodiments, when a memory page is de-allocated, the memory page or the subpages of the memory page may be marked as "deleted," "free," or "trimmed," such that any read to the memory page or subpage will return all "0s," all "1s," or a random pattern, even though no physical memory scrubbing (writing all "0s," all "1s," or random pattern) may have been performed on the memory page or subpages. In some embodiments, when a page is marked as "trimmed," no write operation can be performed on the page. The de-allocated memory page may not be sanitized or initialized before it is allocated again. As such, the number of write operations to the memory page or subpage may be reduced by skipping the sanitization or initialization after the de-allocation.

Figure 9:
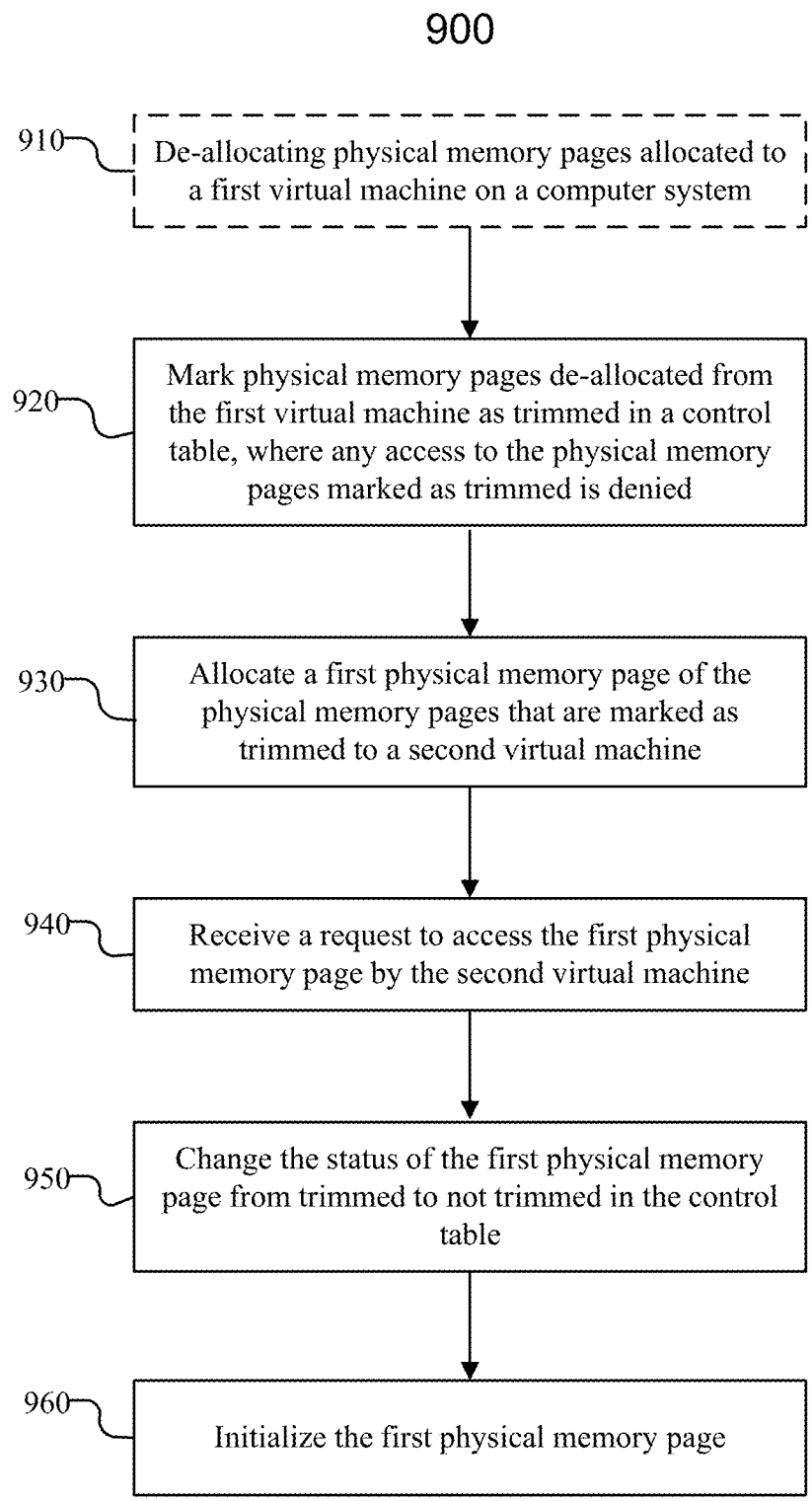
FIG. 9 is a flow chart illustrating an example process, according to some aspects of the present disclosure.

FIG. 9 is a flow chart illustrating an example process 900, according to some aspects of the present disclosure. Process 900 may be performed by a hypervisor, such as hypervisor 340 of FIG. 3, or other agent, such as an MMU (e.g., MMU 212 or 322) and/or a memory controller (e.g., memory controller 220), or other circuits of a computer system.

At block 910, the hypervisor may migrate or stop, shut down, delete, or otherwise terminate a first virtual machine that was running on a computer system, and de-allocate the physical memory pages allocated to the first virtual machine. The first virtual machine may be terminated, for example, when the user finishes user applications using the first virtual machine, when there has been no activities on the virtual machine for a threshold period of time, when the time allocated to the virtual machine has expired, or when a user indicates that the first virtual machine is no longer needed or has been migrated to a different VM. The first virtual machine may be migrated when it is moved from an original physical machine to a new destination physical machine, where the memory, storage, and/or network connection of the first virtual machine are transferred from the original physical machine to the new destination physical machine. When a virtual machine is terminated or migrated, the original hardware resources allocated to the virtual machine may be released or de-allocated such that they may be allocated and used by different virtual machine(s).

At block 920, the hypervisor, MMU, memory controller, or other agent on the computer system may mark physical memory pages de-allocated from the first virtual machine as being "trimmed," "deleted," or "free" in a control table. As noted above, the control table may indicate whether a page is trimmed or not and may be a tracking table such as tracking table 500 or 600, or may be a different control table that only includes the PPN and the status field indicating whether the page is trimmed, where, for example, a "1" in the trim bit of the control table may indicate that the physical page is trimmed. When a physical memory page is marked as trimmed, the memory controller may not allow any VM to read from the physical memory page (e.g., by returning an error message) or may return a sanitized pattern, such as all "0s," all "1s," or a random pattern in response to a read request by any VM. The memory controller may also deny any request by any VM to write into a physical memory page labeled as trimmed. For example, in some embodiments, an error message may be returned when a physical memory page marked as trimmed is accessed for a read or write operation by any virtual machine other than the virtual machine to which the physical memory page is allocated. In some embodiments, when a physical memory page marked as trimmed is accessed for a write operation by a virtual machine to which the physical memory page is allocated, the write operation may be put on hold until the physical memory page is marked as not trimmed and is initialized. In this way, the de-allocated memory pages do not need to be sanitized by writing a sanitized pattern, such as all "0s" or all "1s," and the data used by the first VM is secured to prevent other VMs from accessing the data.

At block 930, when a second VM is to be instantiated, at least a first physical memory page of the physical memory pages de-allocated from the first VM and marked as trimmed may be reallocated to the second VM, as described above with respect to FIG. 7.

At block 940, the hypervisor or memory controller may receive a request to write to the first physical memory page by the second virtual machine. For example, the second virtual machine may request a write operation to a virtual memory page that has not been used. The hypervisor, MMU, or memory controller may map the first physical memory page to the virtual memory page as described above with respect to FIG. 8, such that the write operation to the virtual memory page may actually be performed to the first physical memory page.

At block 950, the status field of the entry in the control table that is associated with the first physical memory page may be changed from trimmed to not trimmed, such as, for example, toggling from "1" to "0". In some embodiments, the status field of the entry in the control table that is associated with the first physical memory page may be changed from trimmed to not trimmed after the first physical memory page is reallocated to the second VM. In some embodiments, the status field of the entry in the control table that is associated with the first physical memory page may be changed from trimmed to not trimmed only after a request to write to the first physical memory page by the second virtual machine is received.

At block 960, after the first physical memory page is labeled as not trimmed, the hypervisor or the memory controller may initialize the first physical memory page and the second VM may be able to access the first physical memory page. In some embodiments, the second VM may write data into the first physical memory page to overwrite the data for the first VM without initialization.

It is noted that although the technique described above with respect to FIG. 9 relates to trimming a physical memory page, a skilled person would understand that the technique may be used to trim a subpage if the status of each subpage of each physical memory page is tracked and kept in a control table as the example tracking table 600 shown in FIG. 6. It is also noted that, although the technique described above with respect to FIG. 9 relates to initializing a physical memory page for a virtual machine, a skilled person would understand that similar technique may be used to initialize a physical memory page for an operating system process in a non-virtualized environment. For example, as described above with respect to FIG. 7, similar technique as described above with respect to FIG. 9 may be performed by an operating system, an MMU, or a memory controller, when a physical memory page is de-allocated from an OS process and/or is reallocated to a new OS process.

Furthermore, as described above with respect to FIG. 6, in some embodiments, a single tracking table may be created and maintained for storing the statistical data (e.g., the number of write operations) and the status information (e.g., the trim bit) for each physical page number or subpage number. Therefore, processes 700, 800, and 900 of FIGS. 7-9 may be performed by a same circuit and/or code, such as using a same hardware/software interface between the hypervisor (or OS) and the memory controller. In some other embodiments, a tracking table may be created and maintained for storing the statistical data, and a separate control table may be created and maintained for storing the status information for each physical page number or subpage number. Therefore, processes 700, 800, and 900 of FIGS. 7-9 may be performed by different circuits and/or code, such as one hardware/software interface between the hypervisor (or OS) and the memory controller for performing process 700 or 800, and another hardware/software interface between the hypervisor (or OS) and the memory controller for performing process 900.

In some embodiment, a memory page or subpage that is de-allocated from a first VM and then re-allocated to a second VM may only be initialized when it is actually about to be written to by the second VM. Because applications running on a virtual machine may not use all memory pages allocated to the virtual machine, writes to at least some memory pages or subpages may be reduced by only initializing the memory pages or subpages when they are actually about to be written to.

Figure 10:
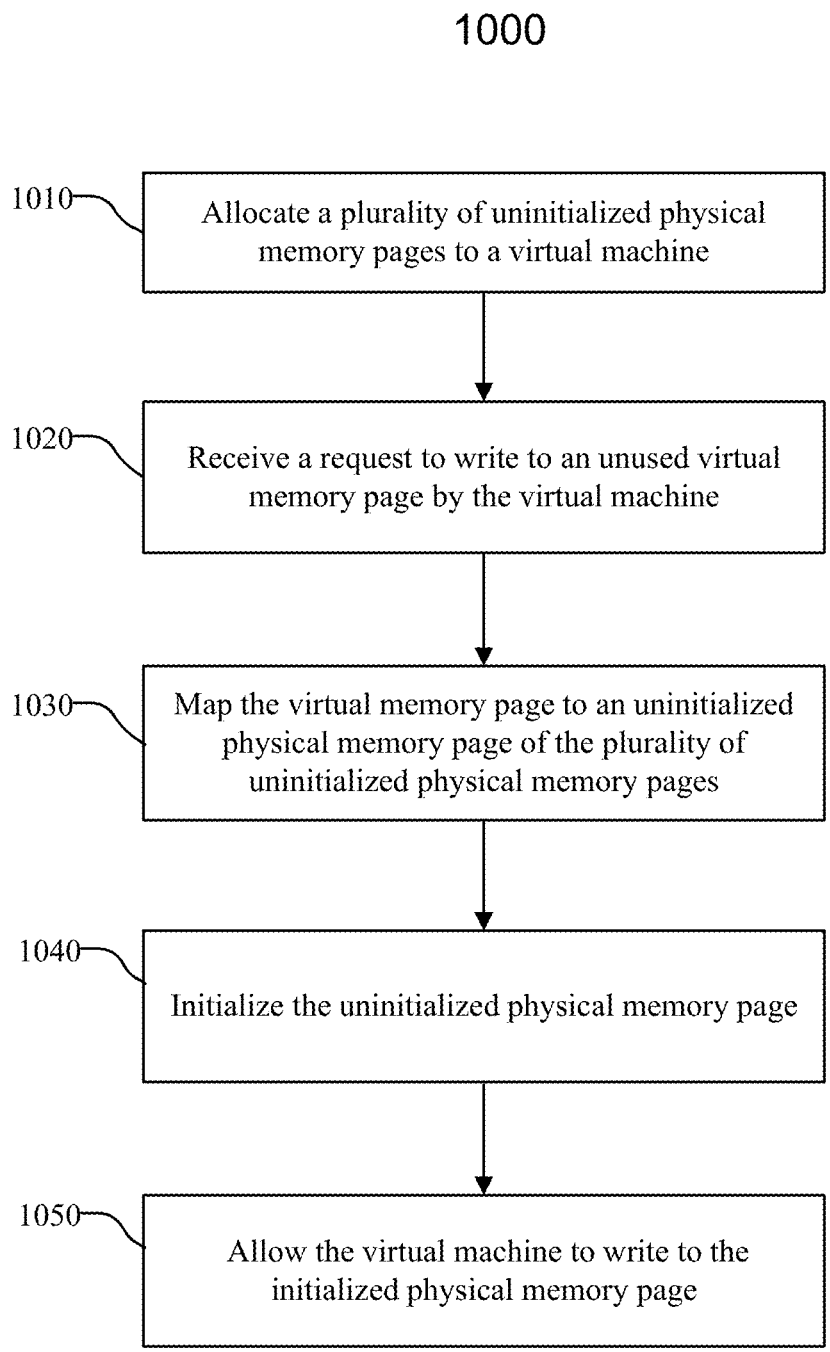
FIG. 10 is a flow chart illustrating an example process, according to some aspects of the present disclosure.

FIG. 10 is a flow chart illustrating an example process 1000, according to some aspects of the present disclosure. Process 1000 may be performed by one or more of a hypervisor, such as hypervisor 340 of FIG. 3, an MMU (e.g., MMU 212 or 322), or a memory controller (e.g., memory controller 220), or other circuits of a computer system.

At block 1010, a hypervisor may allocate a plurality of physical memory pages to a virtual machine, for example, as described above with respect to FIG. 7. The physical memory pages may be de-allocated from one or more terminated VMs and have not been sanitized or reinitialized, in order to reduce the number of writes to these memory pages.

At block 1020, an MMU or a memory controller may receive a request to write to an unused virtual memory page by the virtual machine, where the virtual memory page may be used the first time for the VM and has not been mapped to a physical memory page yet. The request may be received with a virtual memory address that includes a virtual memory page number and an offset in the page.

At block 1030, the hypervisor or the memory controller may select an unmapped and uninitialized physical memory page that is allocated to the virtual machine as described above with respect to FIG. 8, and map the virtual memory page to the selected uninitialized physical memory page of the plurality of uninitialized physical memory pages. A mapping table, such as tracking tables 500 and 600 described above, may be updated to reflect the mapping.

At block 1040, the hypervisor or the memory controller may initialize the selected uninitialized physical memory page by, for example, writing all "0s" or all "1s" into the physical memory page.

At block 1050, after the selected physical memory page is initialized, the hypervisor or the memory controller may allow the VM to write data to the initialized physical memory page.

It is noted that although the technique described above with respect to FIG. 10 relates to initializing a physical memory page, a skilled person would understand that the technique may be used to initialize a subpage if the statistical information and/or the status of each subpage of each physical memory page are tracked and kept in a control table or tracking table as the example tracking table 600 shown in FIG. 6.

Furthermore, although the technique described above with respect to FIG. 10 relates to initializing a physical memory page for a virtual machine, a skilled person would understand that similar technique may be used to initialize a physical memory page for an operating system process in a non-virtualized environment. For example, similar technique may be performed by an operating system, an MMU, or a memory controller, when a physical memory page is allocated to an OS process and is to be written by the OS process for the first time.

In some embodiments, an encryption key and/or scrambling function specific to a virtual machine or an OS process may be used to control the access to data on the memory page allocated to the virtual machine or an OS process, and therefore a new virtual machine or a new OS process would not be able to access meaningful data on the memory page previously used by other virtual machines or OS processes. As such, no initialization may be needed when a de-allocated memory page is reallocated and used by a different VM or OS process.

For example, in some embodiments, a memory controller, such as memory controller 220, may be configured to generate and store cryptographic keys associated with different VMs in a table. The cryptographic keys may be locally stored on the memory controller and may not be accessible to a CPU. In some embodiments, the cryptographic key for each of the respective VMs is unique to the VM so that the encrypted data for one VM may not be decipherable by another VM. In one embodiment, a cryptographic key associated with a VM may be generated by the memory controller 216 using a random number generator. In another embodiment, the cryptographic key may be derived using at least one of a randomly generated key or a remote key received from a remote key management device through a network.

In some embodiments, the memory controller may receive a VM identification (VMID) associated with a VM from the hypervisor when the VM is created. The memory controller may use the VMID for the VM as an index to the table to store a cryptographic key associated with that VM. In one example, a VM may send a transaction request to write data to the physical memory. The transaction request may include data to be written, a destination address for the data to be written, and the VMID. The memory controller may use the VIVID to retrieve the cryptographic key associated with the VM stored in the table to encrypt the data to be written.

In some embodiments, additionally or alternatively, the memory controller may modify the address received in the transaction request using a scrambling function specific to a VM to secure the data. In this way, a VM may not be able to access data belonging to a different VM. Therefore, no sanitization or initialization of de-allocated and re-allocated physical memory pages may be needed.

Figure 11:
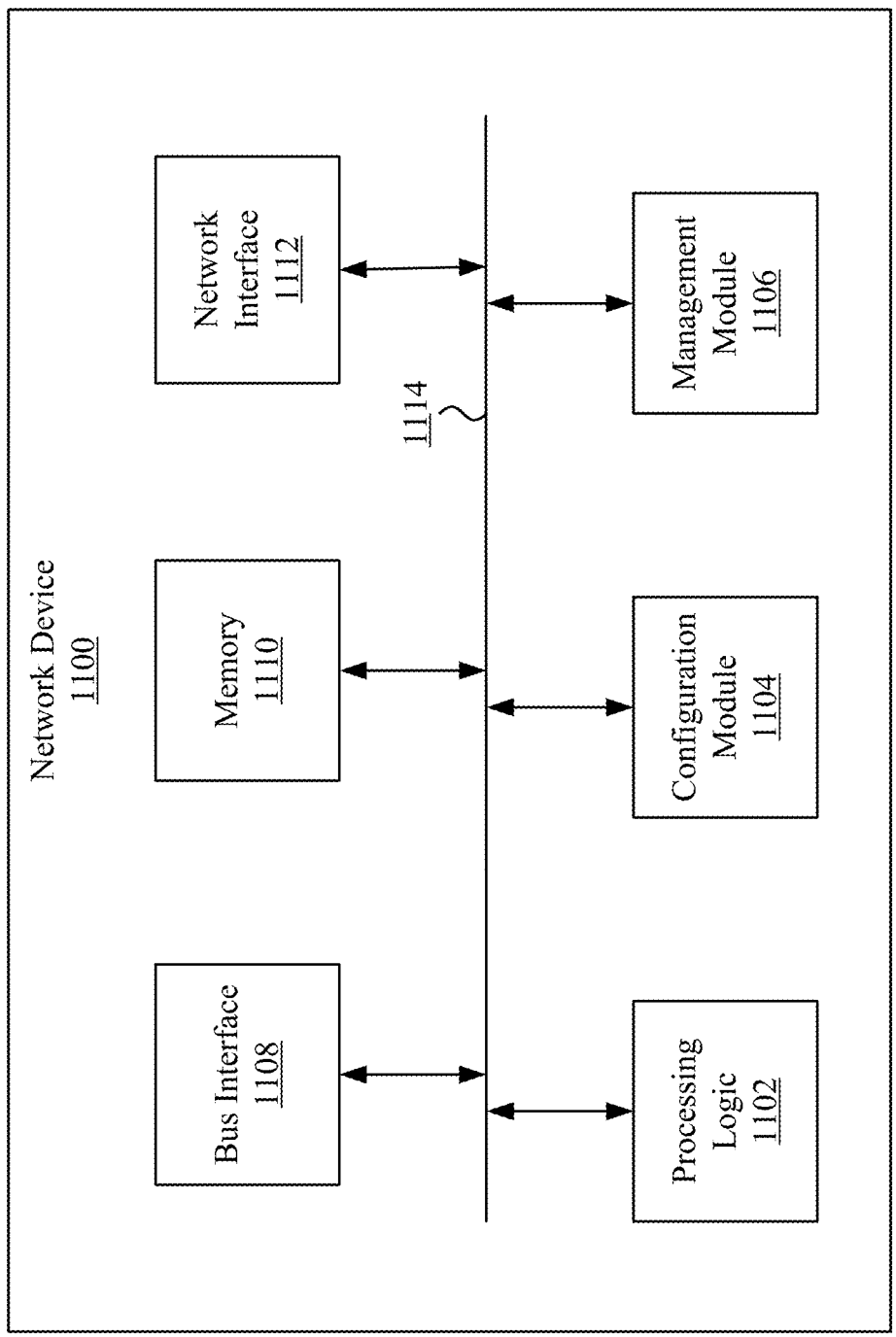
FIG. 11 illustrates an example architecture for features and systems described herein that includes one or more service provider computers and/or a user device connected via one or more networks, according to some embodiments.

FIG. 11 illustrates an example of a network device 1100. Functionality and/or several components of the network device 1100 may be used without limitation with other embodiments disclosed elsewhere in this disclosure, without limitations. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
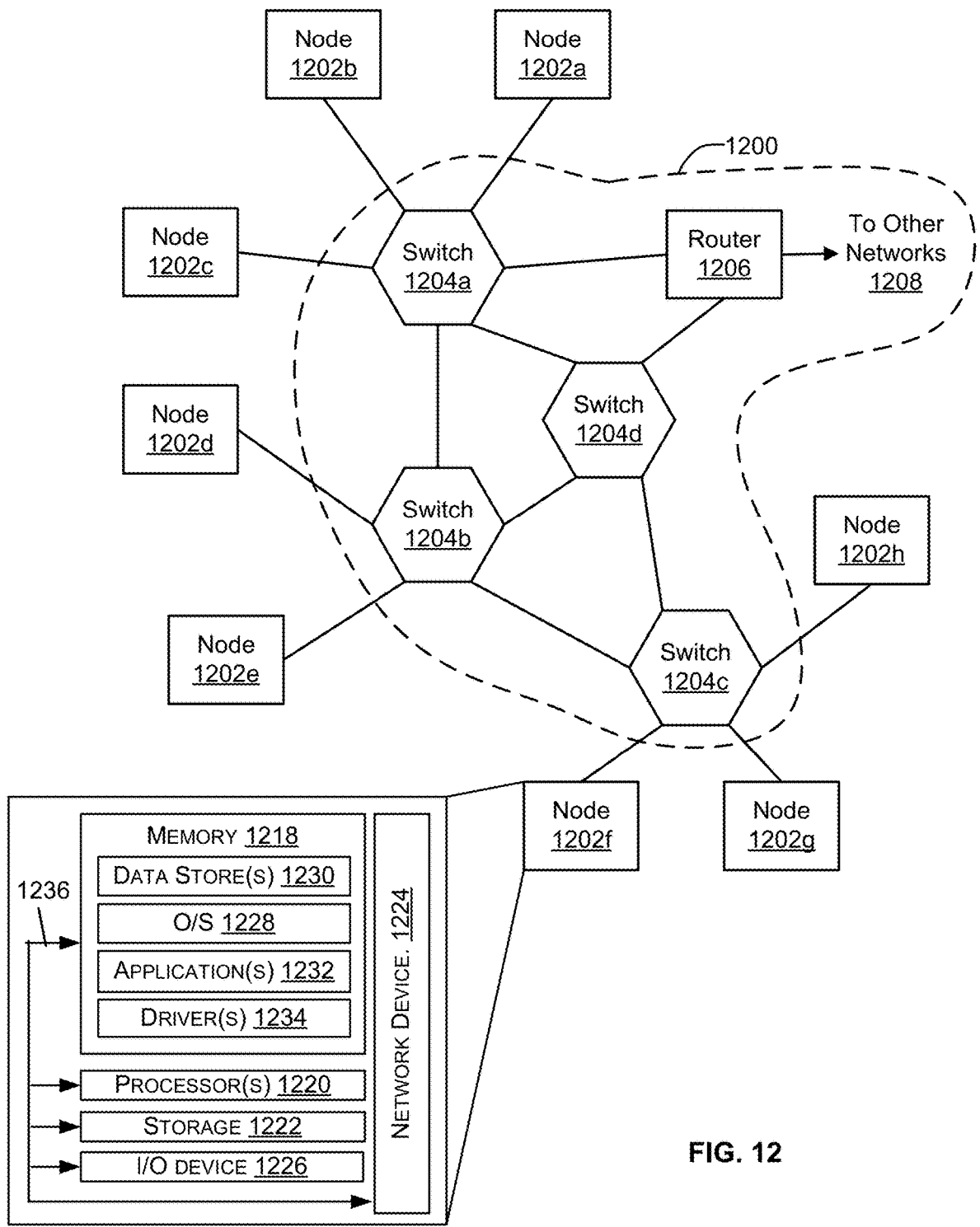
FIG. 12 illustrates aspects of an example environment of a computing system for implementing aspects in accordance with some embodiments.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204*a*-1204*d*, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204*a*-1204*d* may be connected to a plurality of nodes 1202*a*-1202*h* and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204*a*-1204*d* and router 1206, if present, may be referred to as a switch fabric, a fabric, a network fabric, or simply a network. In the context of a computer network, terms "fabric" and "network" may be used interchangeably herein.

Nodes 1202*a*-1202*h* may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202*a*-1202*h* may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. The network device(s) 1224 of FIG. 12 may include similar components discussed with reference to the network device 1100 of FIG. 11.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method of allocating physical memory to a virtual machine, the computer-implemented method comprising:
   tracking an accumulative first count of write operations performed to each physical memory page of a plurality of physical memory pages in a memory of a computer system, the accumulative first count being tracked as a measurement of a degree of write endurance of the respective physical memory page and based on tracking accumulative second counts of write operations performed to subpages of the respective physical memory page, the memory including a storage-class memory;
   saving the accumulative first counts and second counts of write operations to a persistent memory;

receiving, by a hypervisor, a request to allocate physical memory pages in the memory to the virtual machine;

ranking currently un-allocated physical memory pages based on a degree of write endurance of each physical memory page of the currently un-allocated physical memory pages, the degree of write endurance being based on the accumulative first count of write operations performed to the respective physical memory page and a maximum accumulative second count of write operations of a subpage of the respective physical memory page, wherein a first physical memory page of the currently un-allocated physical memory pages having a smaller accumulative first count and a larger maximum accumulative second count than a second physical memory page of the currently un-allocated physical memory pages is determined to have a lower degree of write endurance than the second physical memory page;

selecting, by the hypervisor, a number of currently un-allocated physical memory pages having the highest degree of write endurances based on the selected physical memory pages having the least accumulative first counts of write operations according to the ranking, the selection also being based on a memory size of the virtual machine; and allocating, by the hypervisor, the selected physical memory pages to the virtual machine.

2. The computer-implemented method of claim 1, wherein:

the accumulative first counts and second counts of write operations performed are stored in a tracking table in the storage-class memory.

3. The computer-implemented method of claim 2, wherein the tracking table further stores a status field for each physical memory page of the plurality of physical memory pages, the status field indicating whether the respective physical memory page is trimmed; and wherein the method further comprises:
updating the status fields of each of the selected physical memory pages from trimmed to not trimmed; and
after updating the status fields of the selected physical memory pages, performing write operations to the selected physical memory pages to initialize the selected physical memory pages.

4. The computer-implemented method of claim 3, wherein the virtual machine is a first virtual machine; and wherein the method further comprises:
de-allocating a first physical memory page of the plurality of physical memory pages previously allocated to a second virtual machine;
updating the status field of the first physical memory page to trimmed; and
withholding a write operation to initialize the first physical memory page until at least one of: the status field of the first physical memory page being updated from trimmed to not trimmed, or receiving a write request to the first physical memory page.

5. The computer-implemented method of claim 1, further comprising:

receiving a request to write to an unused virtual memory page by the virtual machine;
ranking physical memory pages that are allocated to the virtual machine, but have not been mapped to virtual memory pages, based on the accumulative first counts and second counts of write operations performed to each of the allocated but unmapped physical memory pages and their subpages; and mapping, to the virtual memory page, a first allocated but unmapped physical memory page with the least accumulative first count of write operations, the first allocated but unmapped physical memory page also having a lower maximum second count of write operations to a subpage than at least some of the other allocated but unmapped physical memory pages being ranked.

6. The computer-implemented method of claim 5, further comprising:

initializing the physical memory page mapped to the virtual memory page.

7. A computer-implemented method comprising:

receiving a request to allocate physical memory pages in a memory of a computer system to a virtual machine or an operating system process, the memory of the computer system including a plurality of physical memory pages;

obtaining a ranking of the plurality of physical memory pages, the plurality of physical memory pages being ranked based on a degree of write endurance of each physical memory page of the plurality of physical memory pages, the degree of write endurance being based on an accumulative first count of write operations performed to the respective physical memory page and a maximum accumulative second count of write operations performed to a subpage among subpages of the respective physical memory page, wherein a first physical memory page of the plurality of physical memory pages having a smaller accumulative first count and a larger maximum accumulative second count than a second physical memory page of the plurality of physical memory pages is determined to have a lower degree of write endurance than the second physical memory page, and wherein the accumulative first counts and the accumulative second counts are stored in a persistent memory; and allocating, to the virtual machine or the operating system process, first physical memory pages of the plurality of physical memory pages with the highest degrees of write endurance based on the physical memory pages having the least accumulative first counts of write operations, the first physical memory pages having lower maximum accumulative second counts than at least some of the plurality of physical memory pages.

8. The computer-implemented method of claim 7, wherein the method is performed by a memory controller of the memory, a memory management unit of the computer system, a hypervisor running on the computer system, or an operating system of the computer system.

9. The computer-implemented method of claim 7, wherein:

the accumulative first counts and the accumulative second counts are tracked by a memory controller of the memory or a memory management unit of the computer system, and are stored in a tracking table.

10. The computer-implemented method of claim 9, wherein obtaining the ranking of the plurality of physical memory pages includes:

ranking the plurality of physical memory pages by the memory controller or the memory management unit;
receiving, by a hypervisor or an operating system, the ranking of the plurality of physical memory pages from the memory controller or the memory management unit; or
receiving, by the hypervisor or the operating system, the accumulative first counts and the maximum accumulative second counts of write operations from the memory controller or the memory management unit, and ranking, by the hypervisor or the operating system, the plurality of physical memory pages based on the received accumulative first counts and the maximum accumulative second counts of write operations.

11. The computer-implemented method of claim 10, wherein:
allocating the first physical memory pages based on the ranking is performed by the memory controller; and
the memory controller is configured to manage a mapping table including virtual memory addresses and corresponding physical memory addresses.

12. The computer-implemented method of claim 10, wherein:
allocating the first physical memory pages based on the ranking is performed by the hypervisor; and
the hypervisor is configured to manage a mapping table including virtual memory addresses and corresponding physical memory addresses.

13. The computer-implemented method of claim 9, wherein:
the tracking table is stored in the persistent memory.

14. The computer-implemented method of claim 7, wherein the memory includes a storage-class memory.

15. The computer-implemented method of claim 7, wherein the ranking of the plurality of physical memory pages is further based on a count of defects of each physical memory page of the plurality of physical memory pages, or a read or write error rate of each physical memory page of the plurality of physical memory pages.

16. The computer-implemented method of claim 7, wherein:
allocating the first physical memory pages to the virtual machine or the operating system process includes allocating the first physical memory pages with lowest maximum accumulative second counts.

17. The computer-implemented method of claim 7, further comprising:
receiving a request to write to an unused virtual memory page by the virtual machine;
obtaining a ranking of physical memory pages that are allocated to the virtual machine but have not been mapped to virtual memory pages based on the accumulative first counts and second counts of write operations performed to each of the allocated but unmapped physical memory pages and their subpages; and
mapping, to the virtual memory page, a first allocated but unmapped physical memory page with the least accumulative first count of write operations, the first allocated but unmapped physical memory page also having a lower maximum second count of write operations to a subpage than at least some of the other allocated but unmapped physical memory pages being ranked.

18. The computer-implemented method of claim 17, further comprising:
initializing the physical memory page mapped to the virtual memory page after the mapping.

19. The computer-implemented method of claim 18, wherein initializing the physical memory page mapped to the virtual memory page after the mapping includes:
initializing only subpages of the physical memory page that are to be written to based on the request.

20. The computer-implemented method of claim 7, further comprising:
obtaining a ranking of physical memory pages that are allocated to the virtual machine but have not been mapped to virtual memory pages based on the maximum accumulative second counts of write operations among the subpages of each of the allocated but unmapped physical memory pages; and
mapping, to the virtual memory page, an allocated but unmapped physical memory page with the lowest maximum accumulative second count of write operations.

21. The computer-implemented method of claim 7, wherein:
the request to allocate physical memory pages in the memory of the computer system to the virtual machine is a request from a hypervisor or is detected by a memory controller of the memory based on a request to write to an unallocated physical memory page.

22. The computer-implemented method of claim 7, wherein the physical memory pages are allocated to the virtual machine or the operating system process based on a count of defects or a read or write error rate of the physical memory pages being below a threshold.

23. A system comprising:
a processor;
a memory controller coupled to the processor; and
a memory coupled to the memory controller and storing machine-readable instructions, the machine-readable instructions, when executed by the processor or the memory controller, causing the processor or the memory controller to:
receive a request to allocate physical memory pages in the memory to a virtual machine or an operating system process, the memory including a plurality of physical memory pages;
obtain a ranking of the plurality of physical memory pages, the plurality of physical memory pages being ranked based on a degree of write endurance of each physical memory page of the plurality of physical memory pages, the degree of write endurance being based on an accumulative first count of write operations performed to the respective physical memory page and a maximum accumulative second count of write operations performed to a subpage among subpages of the respective physical memory page, wherein a first physical memory page of the plurality of physical memory pages having a smaller accumulative first count and a larger maximum accumulative second count than a second physical memory page of the plurality of physical memory pages is determined to have a lower degree of write endurance than the second physical memory page, and wherein the accumulative first counts and the accumulative second counts are stored in a persistent memory; and
allocate, to the virtual machine or the operating system process, first physical memory pages of the plurality of physical memory pages with the highest degrees of write endurance based on the physical memory pages having the least accumulative first counts of write operations, the first physical memory pages having lower maximum accumulative second counts than at least some of the plurality of physical memory pages.

24. The system of claim 23, wherein the machine-readable instructions, when executed by the processor or the memory controller, cause the processor or the memory controller to:
store the accumulative first counts and the accumulative second counts in a tracking table.

25. The system of claim 23, wherein the machine-readable instructions, when executed by the processor or the memory controller, cause the processor or the memory controller to:
  allocate, to the virtual machine or the operating system process, the first physical memory pages with lowest maximum accumulative second counts.

26. The system of claim 23, wherein the machine-readable instructions, when executed by the processor or the memory controller, cause the processor or the memory controller to:
  receive a request to write to an unused virtual memory page by the virtual machine;
  obtain a ranking of physical memory pages that are allocated to the virtual machine but have not been mapped to virtual memory pages based on the accumulative first counts and second counts of write operations performed to each of the allocated but unmapped physical memory pages and their subpages; and
  map, to the virtual memory page, a first allocated but unmapped physical memory page with the least accumulative first count of write operations, the first allocated but unmapped physical memory page also having a lower maximum second count of write operations to a subpage than at least some of the other allocated but unmapped physical memory pages being ranked.

27. The system of claim 26, wherein the machine-readable instructions, when executed by the processor or the memory controller, cause the processor or the memory controller to:
  initialize the physical memory page mapped to the virtual memory page after the mapping.

28. The system of claim 23, wherein the machine-readable instructions, when executed by the processor or the memory controller, cause the processor or the memory controller to:
  obtain a ranking of physical memory pages that are allocated to the virtual machine but have not been mapped to virtual memory pages based on the maximum accumulative second counts of write operations among the subpages of each of the allocated but unmapped physical memory pages; and
  map, to the virtual memory page, an allocated but unmapped physical memory page with the lowest maximum accumulative second count of write operations.

* * * * *